United States Patent [19]
Mistarz

[11] 3,791,894
[45] Feb. 12, 1974

[54] DENESTER SYNCHRONIZER APPARATUS AND METHOD

[75] Inventor: Robert J. Mistarz, Northbrook, Ill.

[73] Assignee: Koehring Company, Milwaukee, Wis.

[22] Filed: Aug. 28, 1972

[21] Appl. No.: 284,035

[52] U.S. Cl. .............. 156/60, 29/208 R, 29/208 F, 156/73, 156/304, 156/362, 156/366, 156/367, 156/556, 156/557, 156/567
[51] Int. Cl. ................................................ B32b 31/16
[58] Field of Search ..... 156/73, 362, 366, 367, 556, 156/557, 566, 567, 350, 351, 304, 294; 221/210; 53/29, 183; 198/22, 20; 29/208 C, 208 B, 208 F

[56] References Cited
UNITED STATES PATENTS

| | | | |
|---|---|---|---|
| 3,220,908 | 11/1965 | Brown et al. | 156/304 X |
| 3,297,504 | 1/1967 | Brown et al. | 156/73 |
| 3,453,803 | 7/1969 | Mojonnier | 53/183 |
| 3,585,096 | 6/1971 | Uhimchuk et al. | 156/73 X |
| 3,607,581 | 7/1971 | Adams | 156/73 X |
| 3,708,376 | 1/1973 | Mistarz et al. | 156/73 X |
| 3,736,896 | 5/1973 | Mistarz et al. | 221/210 |

*Primary Examiner*—Alfred L. Leavitt
*Assistant Examiner*—David A. Simmons

[57] ABSTRACT

Container assembly apparatus, for joining vertically aligned container halves, wherein apparatus for supplying upper and lower vertically aligned container halves to joining apparatus at a container assembly station is provided. The container half supplying apparatus includes upper and lower container half denesters which move stacks of upper and lower nested container halves in independent paths of travel and successively denest the container halves in the stacks and discharge them at generally laterally spaced, upper and lower container half discharge stations, respectively. The container half supplying apparatus also includes mechanism for moving the discharge upper container sections from the upper half discharge station into juxtaposed relation with the lower container halves discharged at the lower half discharge station, and control mechanism, operatively connected in circuit with the upper and lower container half denesters, for operating them to insure the release of the upper and lower container halves at appropriate times during the cycle. The control mechanism includes control elements for insuring that the upper and lower container halves, and particularly the initially and the finally released container halves at the upper and lower half discharge stations, are denested and discharged in properly timed relation to provide sets of vertically aligned halves to travel to the container assembly machine.

16 Claims, 7 Drawing Figures

DENESTER SYNCHRONIZER APPARATUS AND METHOD

BACKGROUND OF THE INVENTION

This invention relates to an apparatus for, and a method of, denesting upper and lower container halves and moving them into vertical alignment so that they can be subsequently joined at a container assembly station. The apparatus incorporates a control system for positively insuring the feeding of mating upper and lower container halves to the container joining assembly during cycle start-up and termination.

A system is disclosed in the present assignee's U.S. Pat. application Ser. No. 154,058, filed June 17, 1971, now U.S. Pat. No. 3,744,212 for denesting upper and lower mating container halves and moving them into vertical alignment so that they can be subsequently joined by friction welding apparatus and then filled with a product. The upper container halves discharged at an upper container half discharge station are moved downstream by a star wheel assembly into superposed relation with the lower container halves at the lower container half denester station and the sets or pairs of halves are then transferred to the friction welding apparatus. The denesters illustrated each include stack supporting denester jaws which are successively opened and closed to successively release the lowermost container halves in the stacks. If, upon cycle start-up, the denesting jaws of both denesters are simultaneously operated to simultaneously release container halves at both denesting stations in the system illustrated, the two initially released lower container halves at the downstream denester station will pass ahead of the initially released upon container halves to the friction welding machine without mating upper container halves. Similarly, if the denester jaws of the upper and lower denesters concurrently cease to release container halves, the two finally released upper container halves at the upstream denester station will pass to the friction welding mechanism without mating lower container halves. The passage of such single container halves through the friction welding apparatus and filling machinery disclosed in the referenced patent application, without mating container halves, obviously necessitates cycle interruptions. Accordingly, it is an object of the present invention to provide apparatus of the type described with denester synchronizing apparatus for synchronizing the release of mating container sections at the beginning and end of a container assembly cycle to insure that the two container sections initially released at the two denester discharge stations and the two container sections finally released at the two discharge stations, are respectively vertically aligned as they pass to the container half joining apparatus.

Another object of the present invention is to provide apparatus of the type described wherein apparatus for feeding container sections from one container section discharge station into vertical alignment with mating container sections discharged at a downstream discharge station incorporates means for delaying the denesting so that the discharge of a container section at the downstream discharge station is delayed until the initially released container section at the upstream discharge station reaches the downstream discharge station.

It is a further object of the present invention to provide apparatus of the type described having a control system for continuing the denesting so that the release of container halves at the downstream station continues until the container half finally discharged at the upstream denester station reaches the downstream station.

A still further object of the prssent invention is to provide apparatus of the character described which includes a control system incorporating sequentially actuated switching means operatively connected to the denesting apparatus for controlling the opening and closing of the denester jaws at appropriate times during cycle operation to insure that the initially and finally dispensed container halves at the two denester discharge stations are released at proper times to insure the presence of a mating container half at the friction welding machine.

SUMMARY OF THE INVENTION

Container assembly apparatus for joining vertically aligned container sections, and apparatus for feeding mating container sections in vertical alignment to said container assembly apparatus comprising: first unstacking means, in which a first plurality of vertical stacks of nested container sections move in an endless path of travel, for successively, individually denesting, the lowermost container sections from the stacks and discharging them at a first discharging station past which the stacks are moved; transfer means for moving the denested container sections downstream past a second container section discharging station; second unstacking means, in which a second plurality of vertical stacks of mating container sections move in an endless path of travel, for successively, individually denesting the lowermost container sections from the second plurality of stacks and discharging them at the second discharging station in juxtaposed relation with the container sections moved thereto from the first discharging station; first control means connected in circuit with the first unstacking means for initiating and interrupting the denesting of container sections by the first unstacking means, second control means connected in circuit with the second unstacking means and incorporated means for delaying the initial denesting of container sections, and accordingly their release at the second discharging station, so that the container section initially discharged at the first discharging station reaches the second station at the time the container section initially discharged at the second discharging station is available and in vertically juxtaposed relation therewith, and means for continuing the denesting movement so that the discharge of container sections at the second station continues until the container section finally discharged at the first discharging station reaches the second discharging station and the container sections finally discharged at the first and second discharging stations travel in vertically juxtaposed relation; and means for moving the vertically aligned container sections in a downstream path of travel to the container section joining apparatus.

The present invention may more readily be understood by reference to the accompanying drawings, in which.

THE GENERAL SYSTEM DESCRIPTION

Apparatus constructed according to the present invention is particularly adapted for use in the system disclosed in the copending, Robert J. Mistarz, et al., U.S. Pat. application Ser. No. 154,058, filed in the U.S. Patent Office on June 17, 1971, and incorporated herein by reference. The machine, generally designated 8, and more particularly described in the referenced patent application, assembles plastic containers, utilizing bulk supplies of nested container halves, fills the containers with milk or other products, and caps and seals the open tops of the filled containers. The machine, generally designated 8, includes a support framework, generally designated 10, mounting upper container half denesting apparatus, generally designated 12, for clockwise rotation about a vertical axis $a$. The denesting apparatus supports eight vertical stacks S of nested upper container halves 16 (FIG. 2) for movement in an endless clockwise path, represented by the arrow $b$, and successively denests the lowermost container sections from sections stacks S and successively discharges them at an upper container half discharge station 17 past which the stacks S are moved. The denesting apparatus 12 is identical to the denesting apparatus 12 disclosed in the referenced patent application.

Figure 3:
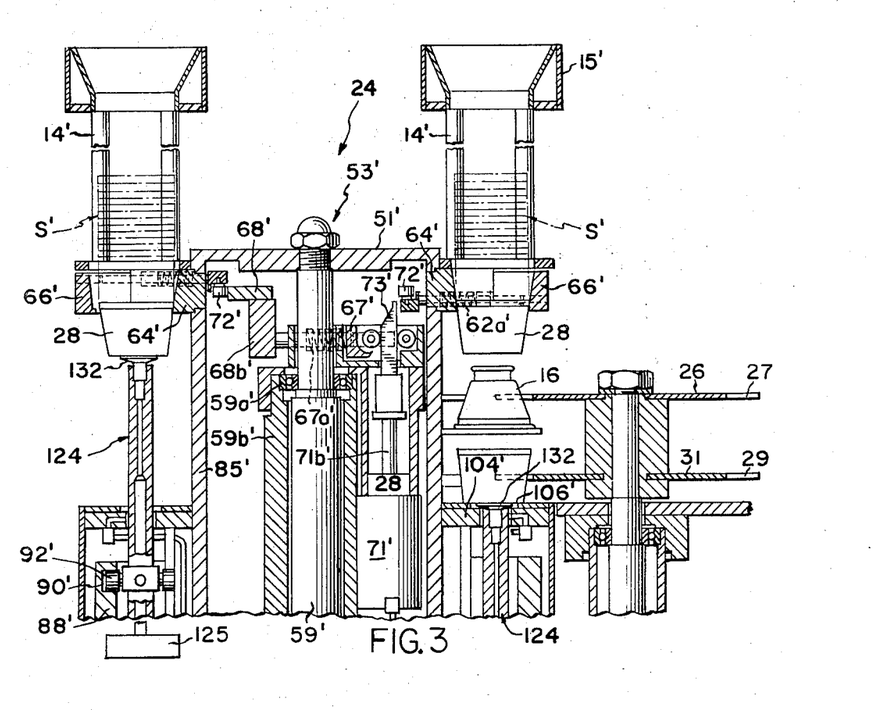
FIG. 3 is an enlarged vertical sectional view, illustrating the lower container half denesting apparatus, taken along the line 3—3 of FIG. 1.

A star wheel assembly 18, constructed identically to the star wheel assembly 18 in the referenced patent application, is mounted on the frame 8 for counterclockwise rotation, in the direction of the arrow $c$, for receiving the denested container halves 16 from the denesting apparatus 12 and transferring them downstream to a container half discharge station, generally designated 19. Lower container half denesting apparatus, generally designated 24 and mounted on the frame 10 for clockwise rotation about the vertical axis $e$ in the direction of the arrow $d$, supports eight vertical stacks S' of nested lower container halves 28 (FIG. 3) for movement in an endless circular path of travel, and successively denests the lowermost container sections from the successive stacks S', and discharges them at the discharge station 19 in superposed relation with the upper container halves 16 moved thereto by the star wheel assembly 18. The denesting apparatus 24 is constructed identically to the denesting apparatus 24 in the referenced patent application and assignee's copending U.S. Pat. application Ser. No. 154,079, filed June 7, 1971, which is incorporated herein by reference.

As described in the referenced applications, the star wheel assembly 18 is a dual level device including superposed, twin, container section-receiving plates 26 and 31 (FIG. 2), having generally vertically aligned, semicircular cutouts 27 and 29 in their peripheral edges of a size to accommodate the upper and lower container sections 16 and 28, respectively which are discharged at the discharge stations 17 and 19. As the star wheel assembly 18 rotates counterclockwisely, in the direction of the arrow $c$, the upper container halves 16 are moved from the upper discharge station 17 into vertical alignment with the lower container halves 28 at the lower half discharge station 19. The vertically aligned sets of container halves 16 and 28 are then transferred by the star wheel assembly 18 to a frame supported, rotary friction welding unit 32 constructed identically to the unit 32 in the aforereferenced application.

As more particularly described in the referenced patent application Ser. No. 154,079, now U.S. Pat. No. 3,735,896 and assignee's copending U.S. Pat. application Ser. No. 154,060, filed June 17, 1971, now U.S. Pat. No. 3,708,376 which is incorporated herein by reference, the friction welding unit 32 receives the upper and lower container halves 16 and 28 on individual holders 32a and moves them clockwisely in an orbital path, in the direction of the arrow $f$, about the vertical axis $g$. The individual container part holders 32a for the lower container sections 28 are brought into contact with an endless drive belt generally designated 34, which serves to spin each of the lower container holders 32a, and the halves held therein, about its axis. After the holders 32a have traveled beyond belt 34, and while the lower container sections 28 are still spinning, the upper and lower container sections 16 and 28 are vertically moved toward each other into abutting relation to friction weld the container sections together to form a container C.

The containers C are transferred from the welding apparatus 32 to a container filling unit 38, by a star wheel assembly, generally designated 36, which is mounted on the frame 10 for counterclockwise rotation, in the direction of the arrow $h$, about its vertical axis $i$ and is constructed identically to the star wheel unit 36 in the referenced applications.

The filler unit 38 is constructed identically to, and operates identically to, the filler unit 38 in the referenced patent applications and rotates clockwisely, in the direction of arrow $j$, about a vertical axis $k$. A main drive unit 41 drives a gear 43 on the filler unit 38 which is intermeshed with a drive gear 39 on the star wheel assembly 36. The star wheel drive gear 39 is intermeshed with a drive gear 33 on the welder unit 32 which is intermeshed with a drive gear 19a on the star wheel assembly 18. The denesters 12 and 24 are rotated by the star wheel drive gear 19a, which is intermeshed with denester drive gears 25 and 13, coupled to the rotating denesters 24 and 12.

The filler unit 38 introduces a supply of product, such as milk, to the containers C as they move in a circular path represented by the arrow $j$, and then transfers the filled containers C to a star wheel assembly, generally designated 40, constructed identically to the star wheel assembly 40 in the above referenced applications. The star wheel assembly 40 is driven by a gear 47, in meshing engagement with the gear 43, in the counterclockwise direction, represented by the arrow $l$, about its vertical axis $m$.

While under the control of star wheel assembly 40, each of the now filled containers C passes beneath the end of a container closure or cap supply device, generally designated 42, which disposes one such cap over the open top of each of the filled containers C. The cap supply apparatus 42 is identical to the cap supply apparatus disclosed in the referenced patent applications.

The filled containers, with the caps resting thereon, are then moved one by one to a heat sealer unit, generally designated 46, supported on the frame 10 for counterclockwise rotation about the axis o in the direction represented by the arrow n. The heat sealer unit 46 is constructed identically to the sealing unit 46 disclosed in the referenced U.S. Pat. application Ser. No. 154,058 and assignee's copending application Ser. No. 154,062, filed in the U.S. Patent Office on June 17, 1971, now U.S. Pat. No. 3,726,749 and incorporated herein by reference. The sealing unit 46 includes eight circumferentially spaced holders 54 for holding containers C to be sealed. A heat sealing unit drive gear 43 for driving the heat sealing unit 46 is intermeshed with the star wheel drive gear 47 and a gear train assembly generally designated 61, which drives the cap supply unit 42 in synchronism with the other mechanisms. The sealed containers C are then delivered to a star wheel unit, generally designated 48, driven by gear 57 intermeshed with the gear 53, which delivers the filled and sealed containers C to a discharge conveyor 50 which carries the containers C to another location to be packed in cases.

Figure 1:
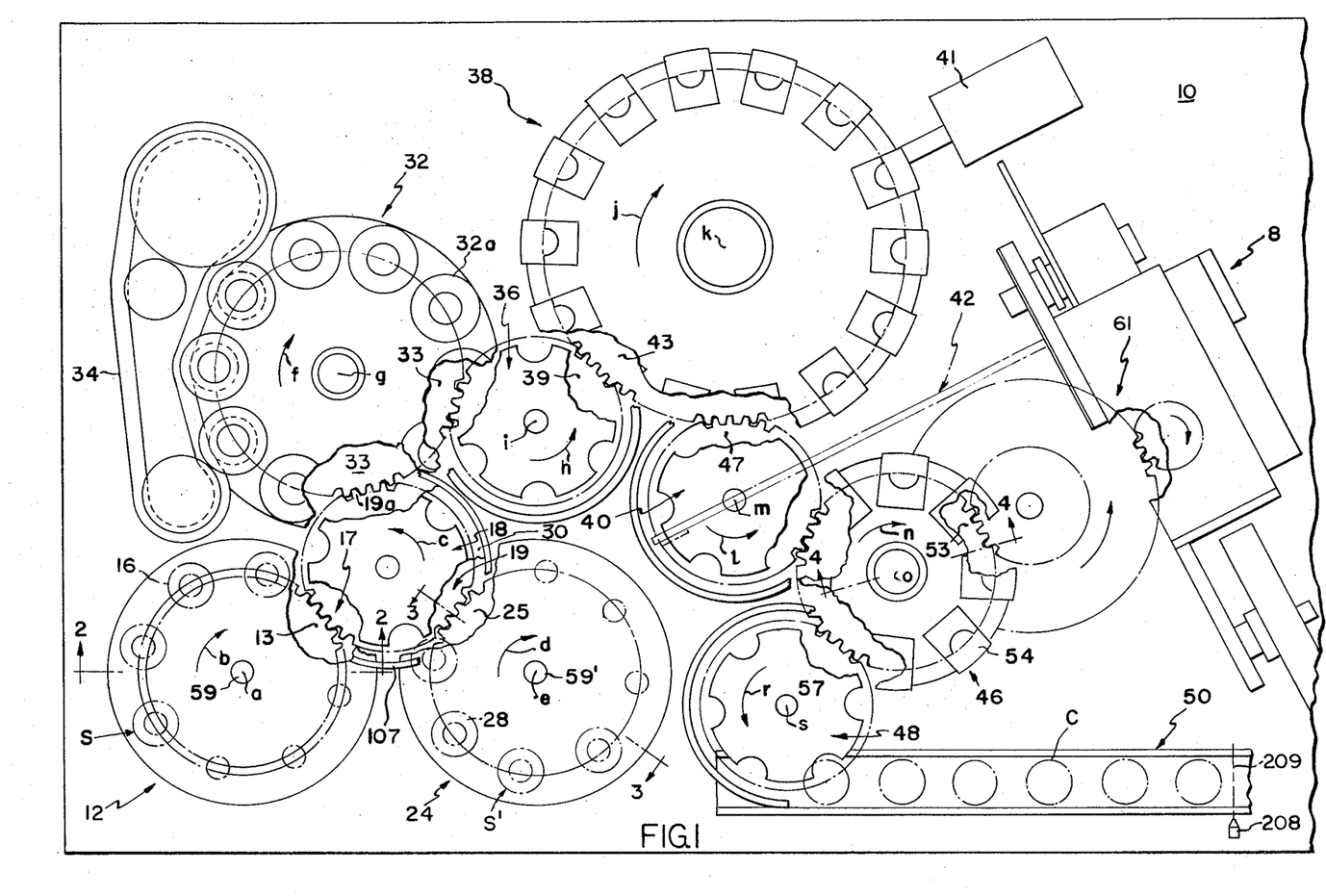
FIG. 1 is a schematic top plan view of the overall processing system in which apparatus constructed according to the present invention is incorporated.
Figure 1A:
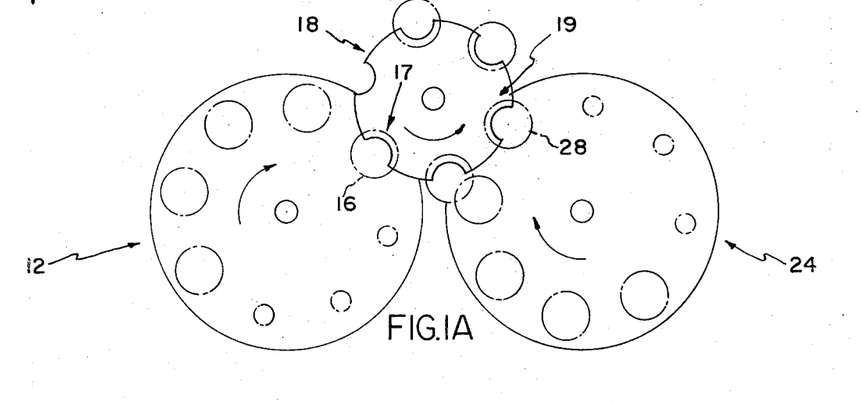
FIG. 1A is an enlarged schematic top plan view of a portion of the system illustrated in FIG. 1.

Referring now more particularly to FIG. 1A, if the lower container half denester 24 discharges a lower container half 28 at the discharge station 19 at the same time that an upper container half 16 is released at the discharged station 17, the initially released lower container half 28 will proceed ahead of the initially released upper container half to the welding unit 32, without a vertically aligned upper mating container half 16. Similarly, if the lower container half denester 24 ceases to dispense container halves 28 at the discharge station 19 at the same time that the upper container half denester 12 ceases to dispense container halves 16 at the denesting station 17, there will be no lower mating container half 28 at the downstream discharge station 19 to be vertically aligned with the finally dispensed upper container half 16 as it moves past the downstream discharge station 19. The present invention solves these problems in a manner to be presently described.

THE UPPER CONTAINER DENESTING APPARATUS

Figure 2:
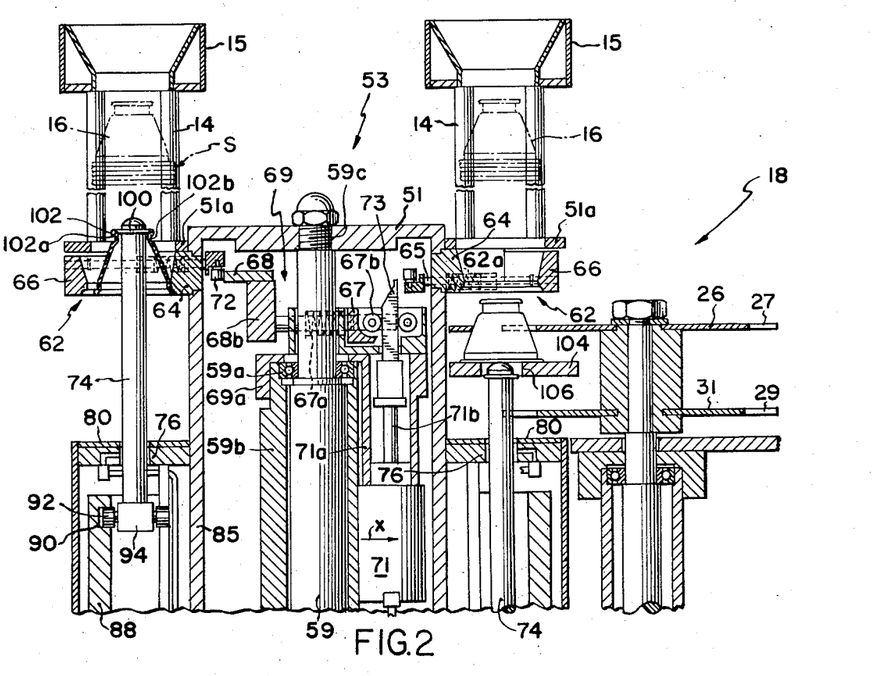
FIG. 2 is an enlarged, vertical sectional view illustrating the upper container half denesting apparatus, taken along the line 2—2 of FIG. 1.

Referring now more particularly to FIG. 2, the upper container section denester apparatus 12 includes a vertical shaft 59 journaled in frame supported bearings (not shown) and driven by the gear 13 which is fixed thereto. The rotating shaft 59 is also journaled in bearings 59a mounted at the upper end of a frame supported upstanding tubular support member 59b. The vertical shaft 59 includes a reduced threaded end 59c, mounting the stack supporting upper end plate 51 of a vertical stack supporting drum 53, which has an annular sidewall 85. The stack supporting plate 51 mounts a plurality of circumferentially spaced rings 51a, that each mount a plurality of vertical guide rods 14 which guide the stacks S of upper container halves 16. The upper ends of the guide rods 14 are fixed to the undersides of funnel-shaped container half supply hoppers 15.

Apparatus is provided for vertically supporting the stacks S in the guide rods 14 and includes a plurality of circumferentially spaced sets of jaw assemblies, generally designated 62, for normally gripping the larger diameter, lower end portions of the lowermost container sections 16 in the stacks S. Each set of jaw assemblies 62 includes an inwardly disposed jaw member 64, fixed to the annular wall 85 of the rotating support drum 53, and an outwardly disposed opposing jaw member 66, which may be supported on the annular wall 85 by means such as actuating members 65, for radial movement toward and away from the jaw member 64 between a radially inner container half gripping position and a radially outer container half releasing position. The outer jaw 66 is normally biased to the closed, container gripping position by means such as springs 62a identical to, and operating identically to, the springs 140 disclosed in the present assignee's copending U.S. Pat. application Ser. No. 154,079, incorporated herein by reference.

Apparatus, generally designated 69 and constructed identically to, and operating identically to, the apparatus particularly disclosed in FIGS. 5 – 7 of the referenced patent application Ser. No. 154,079, is provided for sequentially radially outwardly moving the outer jaw members 66 against the biasing force of springs 62a to radially outer, stack releasing positions and includes a cam supporting carriage 67, supported for generally radially sliding movement on a support member 69a mounted on the upper end of the upstanding tubular support member 59b. The cam supporting carriage 67, which is normally biased in the direction, represented by the arrow x (FIG. 2), by means such as springs 67a reacting between the carriage 67 and the block 69a, includes camming rollers 67b reactable with a camming plate 73 fixed to the piston rod 71b of a double acting, fluid operated solenoid actuated, vertically disposed cylinder 71, supported by support members 71a depending from the support ring 69a.

The cam supporting carriage 67 mounts a support block 68b supporting a camming plate 68 movable between a radially inner, inoperative position and a radially outer, camming position, illustrated in FIG. 2 in the circular path of follower rollers 72 operatively connected to the guide members 65 for moving the stack supporting jaws 66 outwardly. The camming plate 68 is mounted approximately diametrically opposite the container section discharge station 17. As the camming plate 73 is raised to cam the carriage rollers 67b and carriage 67 in a direction opposite the direction represented by the arrow x, the cam plate 68 is moved radially outwardly into the path of the follower rollers 72 to force the stack supporting jaws 66 to radially outward positions, permitting the stacks S of upper container halves 16 to move downwardly between the jaws 64 and 66.

As described in the referenced patent applications, the descent of the stacks S is controlled by a plurality of vertically reciprocable denester rods 74, slidably received in vertically spaced bearings 76 carried by vertically spaced plates 80 attached to the stack supporting drum 53, in vertical alignment with the stacks S. Apparatus is provided for vertically moving the container section denester rods 74 and includes a frame supported tubular support member 88 having a cam track 90 cut in its interior surface for receiving cam follower rollers 92 carried by blocks 94 fixed to the lower ends of the container section denester rods 74. As the stack supporting drum 53 and the container section receiving rods 74 move in a circular path of travel, the cam follower rollers 92 carried by the blocks 94 change the level of the rods and cause them to move up and down as the stacks revolve about the axis $a$ of the cylinder shaft 59. The upper end portion of each of denester rods 74 is provided with a radially protruding rim or flange portion 100 receivable in an enlarged diameter head 102 in the open upper end of each upper container section 16. As will be described more particularly hereinafter, the projections 100 will be pushed through the necked portions 102$b$ of the container sections to engage the marginal wall sections 102$a$ of heads 102 and denest the lowermost, released container sections 16, when the rods 74 move downwardly and while the remainder of the stacks are vertically supported by the jaw assemblies 62.

The cam track 90 has a profile such that when a set of stack supporting jaw assemblies 62 are cammed open by the cam plate 68 opposite the discharge station 17, the aligned denesting rod 74 is in its raised position, as illustrated on the left side of FIG. 2, engaging the lowermost container half 16 in the stack. As the set of jaws 62 open, the denesting rod 74 is cammed upwardly to move the denesting flange 100 up into the head portion 102$a$ of the lowermost container half and to also slightly jostle the stack to permit the stack to readjust and vertically realign itself in the guide rods 14. While the jaws 62 remain open and the denester continues to rotate, the profile of cam 90 is such that the denesting rod 74 moves downwardly to lower the lowermost container section 16 in the released stack below the jaws 62. At this time, the cam follower roller 72 moves circumferentially beyond the cam 68 and the stack supporting jaws 62 close to grip the next lowermost, also descending, container section 16 and again support the stack. The cam profile 90 is such that as the denester 12 continues to rotate the denesting rod 74 will be moved downwardly and the flange portion 100 on the upper end of the denesting rod 74 will strip the released, lowermost container section out of nested relation with the superposed container half and move it downwardly. On continued rotation of the shaft 59, the denesting rod 74, which now supports a denested container half 16, moves through an opening 106 in a support platform 104 to strip the container section 16 therefrom. This occurs at the denesting station 17 where the denested container half 16 is immediately received by a pocket 27 in the star wheel assembly 18. Stationary frame supported, curvilinear guide rails 107 (FIG. 1) are disposed at the periphery of the star wheel assembly 18 and extend into the path of the upper container sections 16 dispensed at the upper container half discharge station 17 to guide the dispensed container halves off the supply unit 12 and on to support platform 30 of the star wheel unit 18. The cutouts 27 and 29 in the vertically spaced star plates 26 and 31 are circumferentially displaced at intervals corresponding to the intervals between adjacent stacks S on the container top half denesting apparatus 12.

THE LOWER CONTAINER HALF DENESTING APPARATUS

The lower container half denesting apparatus, generally designated 24, is similar in construction to the upper container half denesting apparatus 12 and identical parts will be identified by identical reference numerals followed by a prime designation. The lower container half denesting apparatus 24 differs from the upper half denesting apparatus 12 in that the denesting rods 74 are replaced by hollow, vertically reciprocable vacuum denesting tubes 124 communicating with a vacuum source 125 (such as a vacuum manifold and vacuum pump) and having at their upper ends, resilient suction cups 132 which can seal to the undersides of the lowermost lower container halves 28 in the stacks S'. The denester rod actuating cam 90' has a profile such that, at a station generally diametrically opposite the discharge station 19, and at a time when the jaws 64' and 66' are cammed open, the aligned vacuum receiver rod 124 will be moved upwardly by the cam follower roller 92' to raise the supported stack S' of container sections 28 slightly upwardly. This engages the suction cup 132 with the lowermost half 28 in the stack and at the same time slightly jostles the stack S' of container halves 28 to vertically realign the stack in the guide rods 14. The cup 132 then lowers to permit the stack S' to move downwardly until the upper portion of the lowermost container half 28 clears the jaws 64 and 66, after which time the cam follower roller 72' moves circumferentially beyond the cam 68' and permits the jaws 64' and 66' to close on the next lowermost container half 28. As described in the referenced patent applications, during this interval, vacuum is applied to the suction cup 132 to seal it to the closed bottom of the container half 28 and the cam profile 90' is such as to move the denester tube 124 downwardly and strip the lowermost container section away from the next lowermost container section in the stack. With continued rotation of the stack supporting drive shaft 59', the cam follower roller 92' is moved downwardly to move the vacuum denester tube 124, which now supports a denested container half 28, through the slot 106' in the receiver platform 104' to strip the container half 28 from the vacuum cup 132 and deposit it on the platform 104' at the discharge station 19. As the container halves are stripped from the sucton cups 132, the dispensed container section 28 is received by a container cutout 29, in the lower star wheel plate 31, which is in vertical alignment with an upper container half 16 received in the cutout 27 in the upper wheel plate 26. The star wheel assembly 18 then moves the vertically aligned container sections 16 and 28 in a circular path, represented by the arrow $c$, to the friction welder 32 which is constructed identically to and operates identically to, the friction welder 32 in the above referenced applications. The present assignee's U. S. Pat. No. 3,297,504 discloses and claims a friction welder of this character. The upper and lower container halves 16 and 28 are received in individual upper and lower holders 32$a$ on the rotary friction welder and moved clockwisely in the direction of the arrow $f$, about the vertical spin welder axis $g$. As previously indicated, the lower container part holders 32$a$ are then brought into contact with the endless drive belt 34, which serves to spin each of the lower container halves 28 about its axis. After moving beyond belt 34 and while the lower container sections 18 are spinning and the upper container sections 16 are restrained from rotating, the upper and lower container sections 16 and 28 are vertically moved together into vertically lapped relation to friction weld the container sections together and form a container C in the manner indicated in the patent mentioned. The containers C are transferred to the star wheel assembly 36, constructed identically to the star wheel assembly 36 in the above referenced applications, which in turn transfers the container C to the filling assembly 39. The filling assembly fills the containers and discharges the filled containers to a star wheel assembly 40 which transfers them to the cap sealing apparatus 46. While the filled containers C are moving on star wheel assembly 40, the capper apparatus 42 deposits a cap C' on each.

THE SEALING APPARATUS

Figure 4:
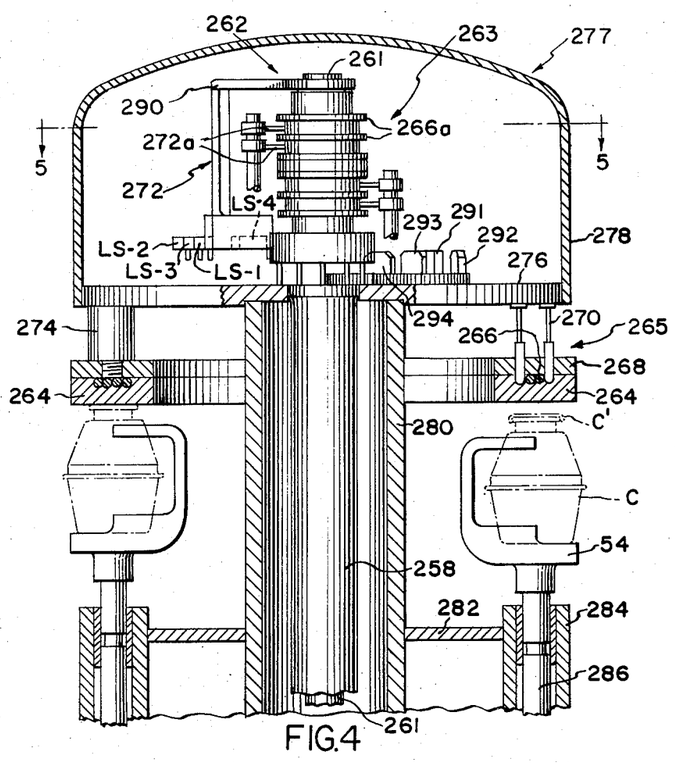
FIG. 4 is an enlarged, vertical sectional view illustrating the closure sealing unit and the switching assembly embodied in the present invention, taken along the lines 4—4 of FIG. 1.

The cap sealing unit 46, (FIG. 4) constructed identically to the sealing apparatus disclosed in assignee's co-pending U.S. Pat. applications Ser. No. 154,062, filed June 17, 1971, incorporated herein by reference and the aforementioned application Ser. No. 154,058, includes an upstanding tubular shaft 258, having the sealer drive gear 53 fixed to its lower end and mounting a dome structure, generally designated 277, at its upper end. The dome structure 277 includes a base plate 276 supporting a stainless steel removable shroud 278. An annular heater ring, generally designated 265, is provided and includes an annular heating plate 264 which is supported on the underside of the base plate 276 by a plurality of circumferentially spaced apart posts 274 and is constructed of appropriate heat conducting material, such as aluminum. The heater 265 includes electrical resistance wires 266, embedded in the upper surface of the ring 264, and connected to electrical leads 270 extending upwardly therefrom. An overlying cover plate 268 is attached to the annular heating ring 264 by screws or the like (not shown). Power is supplied to the heating assembly 265 by apparatus, generally designated 263, including a hollow shaft 261 which passes through the tubular shaft 258 and is fixed, at its lower end, to the frame 10. The power supplying apparatus 263 also includes a stationary armature assembly 262 mounted at the upper end of the shaft 261 and having slip rings 266a connected to a source of electrical power by wires (not shown) passing through the stationary hollow shaft 261. The base plate 276 of the dome assembly 277 also mounts a brush assembly 272 having brushes 272a which ride on the slip rings 266a and are connected to the electrical conductors 270 (which are connected to the heater 265).

As described in the referenced patent applications, container support rods 286 are vertically, reciprocably movable in support cylinders 284 mounted on radial struts 282 fixed to a tubular support sleeve 280 depending from the dome assembly 277. The container support rods 286 mount container holders 54 for holding containers C transferred thereto and are vertically cammed by follower rollers (not shown) for a purpose to be presently described. As the heat sealer 46 is rotated, the support rods 288 are cammed upwardly to move the container holders 54 upwardly and press the closure caps C' against the bottom of the heating plate 264, which heat seals the caps C' to the upper ends of the containers C. The support rods 288 and holders 54 are then withdrawn to lower the containers C and move them to a star wheel assembly 48 which transfers them to the discharge conveyor 50.

THE SYNCHRONIZING SWITCHING ASSEMBLY

Figure 5:
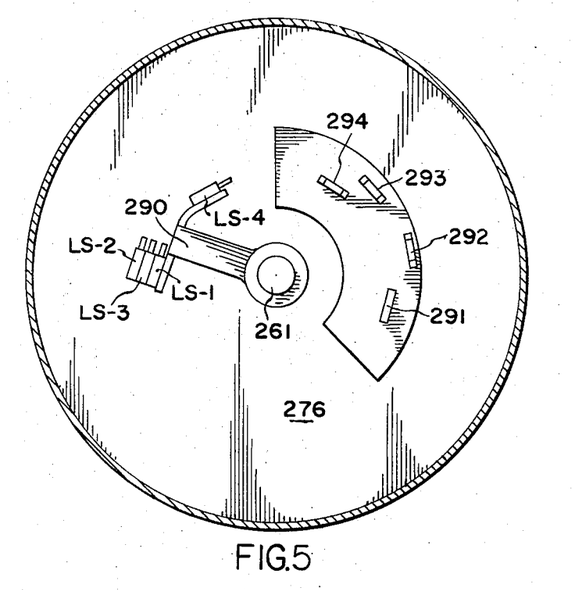
FIG. 5 is a sectional plan view of the switching assembly, taken along the line 5—5 of FIG. 4.

Apparatus for synchronizing the opening and closing of the stack clamping jaws 64 and 66 of the upper denester with the opening and closing of the stack clamping jaws 64' and 66' of the lower container half denester 24 comprises an L-shaped support arm 290 (FIGS. 4 and 5) fixed to the upper end of the stationary cap sealer shaft 261 and mounting a plurality of radially side-by-side limit switches LS-1, LS-2, and LS-3 (FIG. 5) and a circumferentially spaced limit switch LS-4. Fixed on the support plate 276 of the dome assembly 277 are a plurality of actuators 291, 292, 293, and 294 for sequentially actuating the limit switches LS-1, LS-2, LS-3 and LS-4, respectively. The limit switch LS-1 controls the operation of the upper container half denesting cylinder 71 which, when actuated, is operable to move the piston rod 71b and cam plate 73 upwardly and drive the upper container half denesting cam 68 radially outwardly to a position in the path of the jaw actuating follower rollers 72 so that the sets of container denester jaws 62 are successively opened as they follow in their circular path of travel. The limit switch LS-2 is operatively connected in circuit relation with the lower container half denesting cylinder 71' for controlling the flow of operating fluid thereto to move the cam 68' outwardly into the path of the follower roller 72' to force the jaws 66' outwardly as they pass the cam 68'.

The limit switch LS-3 is operatively connected in the control circuit (FIG. 6) to actuate the cylinders 71 and 71' in such a manner as to withdraw the denesting cams 68 and 68' and prevent the jaws 66 and 66' from opening as they move in their endless paths of travel. As will be described more particularly hereinafter, the limit switch LS-4 is operative to reduce the vacuum in the suction cups 132 when the lower container half jaws 64' and 66' are not cammed open so that the lower container halves 28 will never be drawn through the closed jaws 64' and 66'. The limit switches LS-1, LS-2, LS-3 and LS-4 are connected in circuit by wires (not shown) which pass through the hollow shaft 261.

THE CONTROL CIRCUIT

Figure 6:
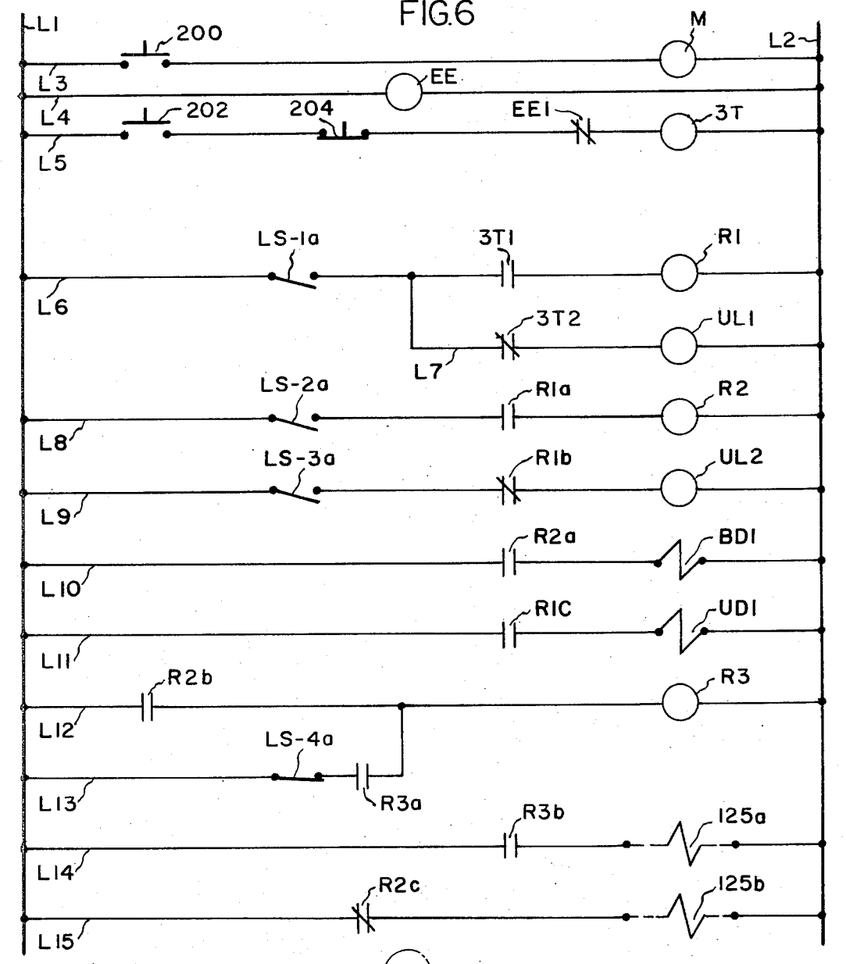
FIG. 6 is a schematic diagram of an electrical control circuit incorporating the switching mechanism embodied in the present invention, for controlling the operation of the apparatus illustrated in FIGS. 1 – 5.

Referring now more particularly to FIG. 6, an electrical control circuit for opening and closing of the sets of denester jaws 62 and 62' in synchronism is disclosed and includes a pair of lines L1 and L2 connected across a suitable source of power such as 110 volt, 60 cycle, alternating current. For purposes of convenience and circuit and sub-circuit lines connected across the lines L1 and L2 have been designated L3 through L15, respectively. A motor, generally designated M, for continuously driving the drive unit 41 (FIG. 1), which continuously drives the various processing units in timed relation, is connected in line L3 in series with a start switch 200. Serially connected in line L5, across the lines L1 and L2, is a start switch 202 for commencing container half denesting, a stop switch 204, and the set of normally closed contacts EE1 of a photoelectric unit EE (connected in line L3 across the lines L1 and L2) supported on the output conveyor 50 and connected across lines L1 and L2 in line L4. The photoelectric timer unit transmits a reflected light beam 209 which, if interrupted by a container C on the conveyor 50 for a predetermined time, is operative to open the contacts EE1. The start and stop switches 202, 204, and photoelectric contacts EE1 are connected in series circuit with a time delay 3T, including a set of normally open contacts 3T1, (line L6) and a set of normally closed contacts 3T2 (line L7). Connected in series in line L6, are the normally open limit switch contacts LS-1a, which close when the upper denester jaw opening limit switch LS-1 is actuated, the normally open time delay contacts 3T1 which close when the time delay timer 3T "times out," and an upper denester control relay R1 including sets of normally open contacts R1a (line L8) and R1c (line L11), and a set of normally closed contacts R1b (line L9). Connected in parallel with the contacts 3T1 and the upper denester relay control R1 (line L7) are the normally closed relay contacts 3T2 which open when the time delay relay 3T "times out" and an unlatching relay UL1 for unlatching the relay R1 and returning the contacts R1a, R1b, and R1c to the positions illustrated in FIG. 6.

Connected in series in line L8, are the normally open limit switch contacts LS-2a, which are closed when the lower denester jaw opening limit switch LS-2 is actuated, the normally open relay contacts R1a, which close when the upper denester jaw operating relay R1 is energized (line L6), and a lower denesting control relay R2 including a set of normally open contacts R2a (line L10) and sets of normally closed contacts R2b (line L12) and R2c (line L16). Connected in line L9 across the lines L1 and L2, are the normally open upper and lower jaw closing limit switch contacts LS-3a which close when the limit switch LS-3 is actuated, the normally closed contacts R1b which open when the upper denester control relay R1 is energized, and the unlatching relay UL2 which unlatches the lower denester control relay R2 and returns the contacts R2a, R2b and R2c to the positions illustrated in the drawings. Serially connected across the lines L1 and L2 in line L10 are the normally open contacts R2a, which close when the relay R2 (line L8) is energized, and a bottom denester solenoid BD1, which, when energized, moves the lower container half denester cam 68' to the radially outer jaw opening position in the path of the cam opening, camming rollers 72'. Connected in line L11, across the lines L1 and L2, are the normally open contacts R1c which close when the relay R1 (line L6) is energized, and the upper container section denester solenoid UD1 which, when energized, moves the upper container half denester cam 68 radially outwardly into the path of the follower roller 72, causing the jaws 66 to successively move to the radially outer, stack releasing position.

Connected across the lines L1 and L2 (line L12) are the normally open contacts R2b which close when the relay R2 (line L8) is energized, and a vacuum control relay R3, including normally open contacts R3a (line L13) and R3b (line L14). Connected in line L13 is parallel with the contacts R2b are the normally open contacts R3a which close when the relay R3 is energized and the normally closed limit switch contacts LS-4a which open when the limit switch LS-4 is actuated. Serially connected in line L15 is a set of normally open contacts R3b which close when the relay R3 is energized and solenoid 125a which, when energized communicates the vacuum source 125 with the lower container half denester suction cups 132.

Connected in line L15, across line L1 and L2 are the normally closed relay contacts R2c, which open when the lower denester control relay R2 (line L8) is energized, and a solenoid 125b for controlling a conventional bleed valve which admits only sufficient air to the source 25 to reduce the vacuum to a level sufficient to hold previously denested container valves 28 on the suction cups 132, but insufficient to pull the lowermost container halves 28 through the closed jaws 64' and 66'. The cam 292 is circumferentially spaced from the cam 291 for actuating the limit switch LS-1, to actuate the limit switch LS-2 and denest the initial lower container half a predetermined time after the initial container half 16 is denested. The spacing is such that the cam 68' will be moved outwardly into the path of the lower jaw opening follower rollers 72' at such time as the initially denested container half 16 has been advanced toward the station 19 a sufficient distance so that the initially denested lower container half 28 will be deposited in vertical alignment with the initially released container half 16 moved to the discharge station 19. When the contacts LS-2a (line L8) close, the relay R2 (line L8) is actuated to close the contacts R2a (line L10) and energize the bottom denester solenoid BD1, which opens the lower container half denester jaws 64' and 66', permitting a lower container half 28 to be released and subsequently deposited in juxtaposed relation with the initially released upper container half 16 moved to the denesting station 19.

THE OPERATION

The start switch 200 (line L3) is closed to energize the motor M, which continuously drives the unit 41 and causes the filler unit gear 43 to continuously drive the denester gears 13 and 25 at the same speed via a gear train including the star wheel gear 39, the spin welder gear 33 and the star wheel gear 19a. The filler unit gear 43 concurrently drives the cap sealer via the star wheel gear 47, which is meshed with the cap sealer gear 53, in timed relation with the rotation of upper and lower container half denesters 12 and 24. When vertically aligned container halves are to be moved to the spin welding apparatus 38, the start switch 202 (line L5) is closed to energize the denester delay timer 3T, which closes the contacts 3T1 (line L6) and opens the normally closed contacts 3T2 (line L7). When the limit switch LS-1 is actuated to close the contacts LS-1a (line L6), the upper denester jaw opening control relay R1 (line L6) will be energized and latched to close the normally open relay contacts R1c (line L11) and energize the upper denester solenoid UD1, (line L11) which forces the upper container half denester cam plate 73 upwardly and drives the cam plate 68 radially outwardly into the path of the jaw opening camming rollers 72. As the follower rollers 72 engage the cam plate 68, the stack supporting jaws 66 of the upper denester are sequentially opened to successively release the stacks S to the stack supporting denester rods 74 which support the stacks S and permit them to move downwardly until the lowermost container halves 16 of the stacks S are below the jaws 64 and 66, at which time the jaws 66 are permitted to close.

The stack supporting denester rods 74 continue downward movement to strip the lowermost container parts 16 from the next lowermost parts in the stacks and move them to the star wheel assembly 18.

The star wheel assembly 18 moves the initially denested upper container section 16 downstream to the lower container half denesting station 19. The lowermost upper container halves 16 of successive stacks S are successively denested from the successive stacks S as they move in their endless paths of travel.

A predetermined time after the initial opening of the upper container half support jaws 64 and 66, the limit switch LS-2 is actuated to close the contacts LS-2a (line L8) and energize the lower denester jaw opening relay R2, which closes the normally open contacts R2a (line L10) and energizes the bottom denester camming solenoid BD1. This forces the lower cam plate 68' radially outwardly into the path of the follower rollers 72' so that the lower supporting jaws 66 are sequentially opened as they pass the cam 68'. The contacts R2b (line L12) are also closed to energize the vacuum control relay R3 which closes the contacts R3b (line L14) and energizes the solenoid 125a which causes vacuum to be communicated to the denester vacuum cups 132. As the jaws 64' and 66' open, the stacks S' are supported by the vertically aligned denester rods 124 which lower the stacks. When a stack has been lowered so that the lowermost container section in the stack clears the jaws 64' and 66', the follower roller 72' clears the cam 68' and the jaws 66' are spring returned into clamping engagement with the next lowermost container half. The vacuum cups 132 on the denester rods 124 seal to the bottom of the lowermost container sections 28 and pull the lowermost container sections 28 from the next lowermost container halves after the jaws 66' are cammed closed. The denester rods 124 deposit the initially denested container halves 28 on support plate 106' where they are received by the lower star wheel plate 31 of the star wheel assembly 18 at the discharge station 19 in vertical alignment with the container halves 16 initially discharged by the upper container half denester 12 at the station 17.

The cycle continues until such time as containers C back up on the discharge conveyor 50 and the photoelectric beam 209 of the photoelectric eye EE is interrupted for a predetermined time to open the contacts EE1 (line L5) to deenergize the time delay relay 3T. This returns the contacts 3T1 and 3T2 (lines L6 and L7) to the positions illustrated in FIG. 1 and unlatches the upper denester jaw opening relay R1, causing the contacts R1a, R1b, R1c to return to the positions illustrated in FIG. 6. When the contacts R1c (line L11) open, the upper denesting solenoid UD1 is deenergized, permitting the upper denesting cam 68 to be spring returned to a position out of the path of the endlessly traveling follower rollers 72 to prevent the further opening of the upper jaws 66. When the relay contacts R1b (line L9) close, the bottom container half denesting control relay R2 remains latched until the cycle interrupting limit switch LS-3 is subsequently actuated to close the limit switch contacts LS-3a (line L9). This unlatches the lower denester jaw opening relay R2 and opens the contacts R2a (line L10) to deenergize the bottom container half denester solenoid BD1 which withdraws the denesting cam plate 68' out of the path of the follower rollers 72' a predetermined time after the upper denester cam 68 was withdrawn from the path of the denester rollers 72. The delay will be such that, as the lower container half denester 24 continues to revolve, the finally denested lower container half 28 will arrive at the discharge station 19 at the same time that the finally released upper container section 16 arrives at the discharge station 19. When the lower denester jaw opening relay R2 is again unlatched, with the closure of the contacts R1b and LS-3a (line L9), the contacts R2c (line L15) close to energize the bleed solenoid 125b which decreases the vacuum in the cups 132 to a level such that the cups 132 will continue to grip any previously denested container halves 28 but there will not be sufficient vacuum for the cups 132 to force subsequent container halves 28 through the closed container jaws 64' and 66'.

It is further to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In combination with container assembly apparatus for joining vertically aligned, thermoplastic container sections; apparatus for feeding thermoplastic container sections in vertical alignment to said container assembly apparatus comprising:

frame support means;

means on said frame support means for moving a first plurality of vertical stacks of nested container sections in a path of travel;

first denesting means for successively, individually denesting, the lowermost container sections from the stacks and discharging them at a first discharging station;

transfer means on said frame support means including means for moving the denested container sections downstream to a second container section discharging station;

means on said frame support means for moving a second plurality of vertical stacks of nested container sections in a path of travel;

second denesting means for successively, individually denesting the lowermost container sections from the second plurality of stacks and discharging them at said second discharging station in juxtaposed relation with the container sections moved thereto from the first discharging station; and control circuit means adapted to be connected to a source of power including:

first control means connected in circuit with said first denesting means for initiating, and for interrupting, the denesting and discharge of container sections by said first denesting means; and second control means connected in circuit with said second denesting means for initiating, and for interrupting, the denesting and discharge of container sections by said second denesting means including means for delaying the initial discharge of a container section by said second denesting means at said second discharging station until said first denesting means discharges an initial container section at said first station and the container section initially discharged at said first discharging station is at said second station so that the container sections initially discharged at said first and second discharging station are in juxtaposed relation and means for continuing the discharge of container sections at said second station until the discharging of container sections at said first discharging station is completed and the finally released container section at said first station is at said second discharging station so that the container sections finally released at the first and second discharging stations travel in juxtaposed relation;

said transfer means including means for moving the juxtaposed container sections downstream of said second station to the container assembly apparatus.

2. The apparatus of claim 1 wherein said control circuit means includes a plurality of switching means sequentially actuated when said stacks move in said paths of travel to control the denesting of the container sections by said second denesting means and means movable in a path in timed relation with the movement of said second denesting means for sequentially actuating said switching means.

3. The apparatus of claim 1 wherein said first and second denesting means each includes sets of stack supporting denester jaws movable between container gripping positions gripping the lowermost container sctions in the stacks and spread positions permitting the stacks to free-fall; said control circuit means including a plurality of switching means sequentially actuated when said stacks move in said paths of travel, and means responsive to the actuation of said switching means for momentarily causing the jaws supporting successive stacks to sequentially move to said spread positions to permit the stacks supported thereby to free-fall and for immediately causing the jaws to return to said container section gripping positions; said means for delaying the initial discharge including means connected in said control circuit means for delaying the separation of the jaws of the second denesting means for a predetermined time after a set of jaws on said first denesting means is initially opened and continuing the sequential opening and closing of jaws of said second stack of container sections for a predetermined time after a final set of jaws on the first denesting means has been closed.

4. The combination set forth in claim 1 wherein each of said first and second denesting means includes a plurality of separable, stack support members, movable between positions supporting opposing edge portions of the lowermost container sections of the stacks supported thereby, to prevent free-fall of the stacks and spread positions permitting the stacks to free-fall; said first and second control means includes first and second operating means movable between inoperative and operative positions for successively momentarily causing the support members in successive stack support means of said first and second container section denesting means, respectively, to successively spread and successively permit the lowermost container sections of the successive stacks to free-fall between the associated support members and for immediately causing said support members to return to said support positions to receive the also descending next lowermost container sections; said first and second control means including first and second drive means for moving said first and second operating means to said operative positions to cause the successive release of the lowermost container sections from successive stacks at said first and second discharge station, respectively, when said first and second container section denesting means respectively move in said paths, and for moving said first and second operating means to said inoperative positions to prevent the release of container sections by said first and second container section denesting means;

said second control means including means precluding movement of said second operating means to said operative position for a predetermined time after said first operating means is moved to said operative position so that the container section initially discharged by said first denesting means at said one discharge station is moved downstream to said second discharge station to be juxtaposed with a container section initially discharged at said second station;

said second control means including means preventing movement of said second operating means to said inoperative position for a predetermined time after said first operating means is moved to said inoperative position so that the container section finally released by said first denesting means has been moved downstream to said other discharge station to be juxtaposed with the container section finally discharged by said second container denesting section means.

5. The combination set forth in claim 4 wherein said first and second control means includes first, second, and third electrical circuit switching means movable between opened and closed positions, and actuating means movable in an endless path of travel in timed relation with movement of said stacks in said paths for sequentially actuating said switching means.

6. The combination set forth in claim 4 wherein said first and second control means includes first, second and third openable and closable switch means sequentially movable between open and closed positions when said first and second denesting means move in said endless paths, means connected in said control circuit means and responsive to said first switch means being moved to said closed position to cause said first operating means to be moved to said operative position causing the stack support members on said first supply means to be sequentially moved to said open positions; means, connected in said control circuit, and responsive to said second switch means being moved to said closed position a predetermined time after said first switch is moved to said closed position, to cause said second operating means to be moved to said operative position, and the stack support members on said second denesting means to be sequentially moved to said open position only a predetermined time after said first operating means is moved to said operative position.

7. The combination set forth in claim 6 wherein said first and second control means includes further switch means operable to interrupt power to said first drive means to return said first operating means to said inoperative position, and means is connected in circuit with said third switch means for causing said second operating means to be moved to said inoperative position only a predetermined time after said first operating means is returned to said inoperative position.

8. The combination set forth in claim 6 wherein said stack support means on at least one of said denesting means includes a plurality of vacuum applying means movable in an endless path, and including suction cup means vertically movable between raised positions gripping the lowermost container sections supported by said support members and lowered positions to strip the lowermost container sections from the stacks, and means connected in said control circuit means for reducing the vacuum forces applied by said suction means, when said first and second operating means are in said inoperative positions, to an amount insufficient to enable said suction cup means to withdraw container sections downwardly past said support members but sufficient to grip already withdrawn container sections.

9. The combination set forth in claim 1 wherein said means for delaying the initial discharge of a container section comprises means for delaying the denesting of the initial container section by said second denesting means from said second plurality of stacks for a predetermined time after the initial container section is denested by said first denesting means; and said means for continuing the discharge of container sections comprises means for continuing the denesting of container sections by said second plurality of stacks for a predetermined time after the final container section is denested by said first denesting means.

10. In combination with apparatus for joining axially aligned, container sections to form a container, apparatus for supplying upper and lower, vertically aligned container sections to the joining apparatus including:
   first container section supply means, having a supply of upper container sections associated therewith, for individually, successively dispensing said upper container sections at a discharge station;
   second container section supply means, having a supply of lower container sections associated therewith, for individually, successively dispensing said lower container sections at a discharge station;
   first transfer means disposed interjacent said first and second container section means, for sequentially receiving said dispensed container sections discharged by one of said container section supply means at one of said discharge stations, moving them downstream to be juxtaposed with container sections discharged by the other container section supply means at the other of said discharge stations and delivering the juxtaposed container sections to said joining apparatus in vertical alignment;
   control circuit means adapted to be connected to a source of power;
   means connected in said control circuit means for synchronizing the release of container sections by said first and second container section supply means in timed relation including means for operating said one container section supply means to successively dispense a line of container sections to said one station; and
   means connected in said control circuit means for preventing said other container section supply means from dispensing container sections to said transfer means until the container section initially dispensed by said one supply means is at said other discharge station so that the container sections initially dispensed by said first and second container section supply means travel to said joining apparatus in juxtaposed relation and for causing said other container section supply means to continue successively releasing container sections until the container section finally released by said one container supply means is at said other discharge station so that the container sections finally released by said first and second container supply means travel to said joining apparatus in juxtaposed relation.

11. In combination with container assembly apparatus for joining vertically aligned, thermoplastic container sections; apparatus for feeding thermoplastic container sections in vertical alignment to said container assembly apparatus comprising:
   frame support means;
   means on said frame support means for moving a first plurality of vertical stacks of nested container sections in a path of travel;
   first denesting means for successively, individually denesting, the lowermost container sections from the stacks and discharging them at a first discharging station;
   transfer means on said frame support means including means for moving the denested container sections downstream to a second container section discharging station;
   means on said frame support means for moving a second plurality of vertical stacks of nested container sections in a path of travel;
   second denesting means for successively, individually denesting the lowermost container sections from the second plurality of stacks and discharging them at said second discharging station in juxtaposed relation with the container sections moved thereto from the first discharging station; and
   control circuit means adapted to be connected to a source of power including:
   first control means connected in circuit with said first denesting means for initiating and interrupting the denesting of container sections by said first denesting means; and
   second control means connected in circuit with said second denesting means for initiating and interrupting the denesting of container sections by said second denesting means including
   means for delaying the initial denesting operation of said second denesting means for a predetermined time after a container section is initially denested so that the container section initially denested by said first denesting means is at said second station when the container section initially denested by said second denesting means is discharged at said second station and the container sections initially denested by said first and second denesting means travel in juxtaposed relation and
   means for continuing the denesting operation of said second denesting means for a predetermined time after the denesting operation by said first denesting means is completed so that the container section finally released at said first discharging station is at said second discharging station when the finally denested container section from said second plurality of stacks is discharged at said second station and the container sections finally released at the discharging stations travel in juxtaposed relation;
   said transfer means including means for moving the juxtaposed container sections downstream of said second station for further processing.

12. The apparatus set forth in claim 11 including container sealing means for moving said containers assembled by said container assembly apparatus, in timed relation with the movement of said first and second pluralities of stacks and for sealing the upper ends of the containers as they are being moved; said first and second control means includes first, second, and third electrical circuit switching means, and actuating means carried by said sealing means for movement therewith for sequentially actuating said first, second and third switch means to sequentially operate said first and second denesting means.

13. A method of feeding mating container sections from a pair of container section denesting stations into vertical alignment for subsequent joining comprising the steps of:
- moving a first plurality of vertical stacks of nested container sections in a path and successively individually, denesting the lowermost container sections from the stacks and discharging them at a first discharging station past which the stacks are moved;
- moving the denested, container sections downstream to a second container section discharging station; and
- moving a second plurality of vertical stacks of nested container sections in a path and successively individually denesting an identical number of the lowermost container sections from the second plurality of stacks and discharging them at the second discharging station in juxtaposed relation with the container sections moved thereto from the first discharging station;
- said last mentioned moving step being accomplished by
  - delaying the discharge of the initial container section at said second discharging station until the container section initially discharged at said first station is at said second station so that the container sections initially discharged at said first and second discharge stations travel in juxtaposed relation and
  - continuing the release of container sections at said second station until the container section finally released at said first station is at said second station so that the container sections finally released at the denester stations travel in juxtaposed relation.

14. The method set forth in claim 13 wherein the delay in discharging is accomplished by delaying the denesting of the initial container section from said second plurality of stacks for a predetermined time after the denesting of the initial container section from said first plurality of stacks.

15. The method set forth in claim 13 wherein the denesting of each stack is accomplished by supporting the lowermost container section in each stack and successively releasing the lowermost container section and permitting the stack to descend, supporting the next lowermost also descending container section and permitting the lowermost container section to free-fall; said second mentioned denesting step being accomplished by preventing the denesting of the initial container section for a predetermined time after the denesting of the initial container section from said first plurality of stacks is accomplished so that the container sections released at said first and second discharge stations are juxtaposed.

16. A method of feeding mating container sections from a pair of container sections discharge stations to a common juncture comprising the steps of:
- successively individually, discharging container sections at a first discharge station;
- moving the container sections from the first discharge section in a downstream path to a second discharge station;
- successively discharging an identical number of individual mating container sections at the second discharge station in timed relation with the discharge of the container sections at the first discharge station into axial alignment with the container sections released at the first station and moved past the second station;
- the discharging of container sections at the second discharge station including
  - delaying the discharge of the initial mating container section at the second discharge station until the container section initially discharged at the first discharge station is at the second discharge station so that the initially discharged container sections are axially aligned; and
  - continuing the release of container sections at the second discharge station until the container section finally discharged at the first station is at the second discharge station so that the container sections finally discharged at the first and second stations are axially aligned.

* * * * *